United States Patent

[11] 3,577,908

| [72] | Inventor | Frederick J. Burg |
| | | Bellrose, N.Y. |
| [21] | Appl. No. | 829,324 |
| [22] | Filed | June 2, 1969 |
| [45] | Patented | May 11, 1971 |
| [73] | Assignee | Salton, Inc. |
| | | New York, N.Y. |

[54] EGG COOKER
11 Claims, 5 Drawing Figs.

[52] U.S. Cl.................................................. 99/333,
99/340, 99/440, 219/272, 219/442
[51] Int. Cl........................................................ A47j 27/62
[50] Field of Search............................................ 219/441,
442, 272, 436, 438; 99/328, 331, 332, 333, 343,
440, 340

[56] References Cited
UNITED STATES PATENTS

| 2,445,021 | 7/1948 | Clark............................ | (99/333UX) |
| 2,518,566 | 8/1950 | Osterheld..................... | 99/440 |
| 2,562,763 | 7/1951 | Best............................. | 219/442 |
| 2,761,375 | 9/1956 | Jepson......................... | 99/440X |
| 2,806,123 | 9/1957 | Steinbock.................... | 219/272 |
| 2,807,701 | 9/1957 | Conlin et al. ................ | 99/440X |
| 3,147,689 | 9/1964 | Sakamoto et al............ | 99/440X |
| 3,396,655 | 8/1968 | Yoshioa et al............... | 99/440X |

*Primary Examiner*—Billy J. Wilhite
*Attorney*—Edward D. O'Brian

ABSTRACT: An egg cooker is disclosed which utilizes an electrically heated, covered water container. During the operation of the cooker the amount of heat supplied to the container is regulated by an adjustable thermostat operating essentially as an infinite switch. This thermostat regulates the heat supplied so that the cooking time is varied in accordance with the rate at which water is boiled in the container and escapes from the container past the lid as steam. A fixed thermostat is provided to shut off the power to the heating element used when all water has been evaporated.

Patented May 11, 1971
3,577,908
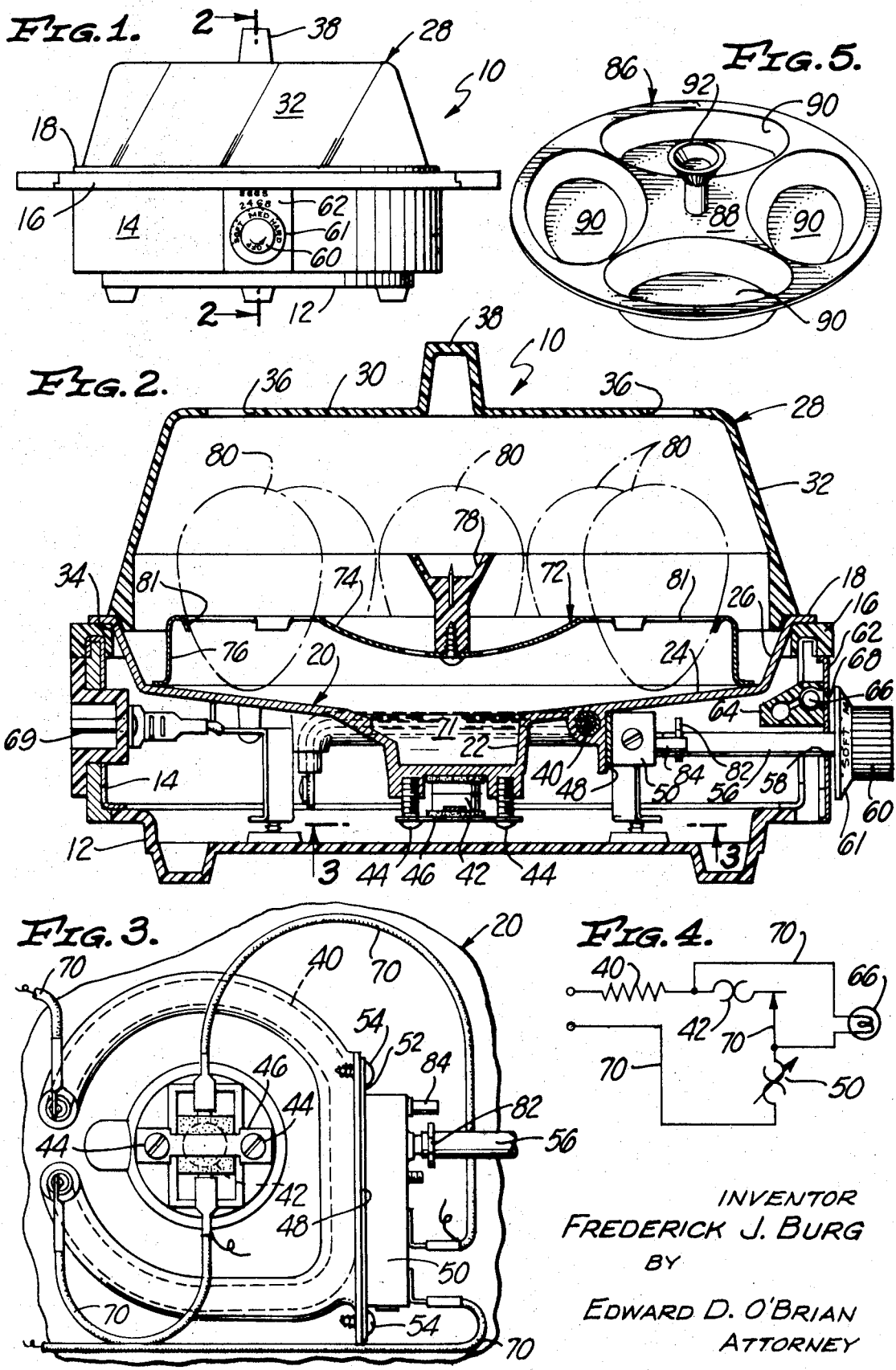
INVENTOR
FREDERICK J. BURG
BY
EDWARD D. O'BRIAN
ATTORNEY

EGG COOKER

BACKGROUND OF THE INVENTION

Although eggs are one of the oldest foods known to mankind, the cooking of eggs has been considered to present a significant problem. This is because many individuals desire eggs to be consumed to be cooked in substantially a precise condition of consistency. Thus, for example, many individuals desire so-called "3-minute eggs" of a precise character which can be achieved only by applying a precise amount of heat. These considerations have led to the development of various types of specialized egg-cooking devices. An understanding of the present invention does not require a discussion of most of these prior structures. However, an understanding of the present invention is considered to require an understanding of prior so-called "automatic" electric egg cookers.

In these prior automatic electric egg cookers, the egg or eggs to be cooked are located in the cooking chamber together with a variable quantity of water. Heat is applied in these prior devices so as to vaporize the water as steam. The steam by contact with the egg or eggs cooks them. A fixed thermostat is normally provided in this type of device to automatically shut off the heat supply when the temperature of the container used to hold the water significantly exceeds the boiling point of water. Such a temperature is, of course, achieved when all of the water present has been vaporized.

Such prior automatic electric egg cookers are considered disadvantageous because with them the time of the cooking cycle is completely dependent upon the amount of water utilized. With these prior structures it is relatively difficult and inconvenient to precisely and accurately control the amount to which eggs are cooked. With these prior devices, frequently a user will make a mistake as to the quantity of water required to cook an egg or eggs to a precise consistency.

SUMMARY OF THE INVENTION

An object of the present invention is to provide new and improved egg cookers. More specifically an object of this invention is to provide egg cookers which overcome various limitations and disadvantages of prior "automatic" electric egg cookers as indicated in the preceding. Further objectives of this invention are to provide egg cookers which may be easily and conveniently constructed, which may be easily used, which are capable of giving prolonged and reliable performance, and most important, which are capable of being used so as to consistently cook eggs in a desired manner.

In accordance with this invention, these objectives are achieved by providing an egg cooker in which heat is applied to an enclosed container from which steam can escape in accordance with the operation of a switch means capable of repeatedly opening and closing at a rate depending upon the setting of such switch means. With this type of structure, it is possible to utilize a fixed amount of water so as to achieve cooked eggs of a desired consistency by regulating the rate at which steam is formed through the operation of this adjustable thermostat.

BRIEF DESCRIPTION OF THE DRAWING

The manner in which an egg cooker of the present invention operates and achieves the aforegoing and other related objectives of the invention will be apparent from a detailed consideration of the remainder of this specification, the appended claims and the accompanying drawings in which:

FIG. 1 is a front elevational view of a presently preferred embodiment or form of an egg cooker of this invention;

FIG. 2 is a cross-sectional view taken at line 2—2 of FIG. 1 in which certain parts are shown in elevation;

FIG. 3 is a partial cross-sectional view taken at line 3—3 of FIG. 2;

FIG. 4 is a schematic view illustrating the electric circuit employed in the illustrated egg cooker; and FIG. 5 is an isometric view of a tray used for poaching eggs with the egg cooker shown.

It will be realized that the accompanying drawing is primarily intended to be used for explanatory purposes. From this it will be apparent that the essential features of the present invention can be embodied within other differently appearing and somewhat differently constructed egg cookers.

DESCRIPTION OF THE PREFERRED EMBODIMENT

The egg cooker 10 of the present invention illustrated includes a base 12 adapted to rest against an appropriate supporting surface (not shown) and a peripheral generally cylindrical sidewall 14. The uppermost extremity of this wall 14 supports an annular mounting member 16 which in turn supports a peripheral flange 18 on a metal container 20. This container 20 has a centrally located cup or receptacle 22 surrounded by a conical, nearly flat wall 24. This wall 24 is attached to another conical wall 26 which carries the flange 18.

The container 20 is adapted to be enclosed by a cover 28 having a top 30 and a peripheral skirt 32. This skirt has a lower notched edge 34 which fits against and engages a part of the flange 18 and part of the wall 26 so as to prevent accidental or unintentional movement of the cover 28 with respect to the remainder of the cooker 10. The top 30 also includes vent openings 36. If desired this top 30 may be formed to include a small handle portion 38 for use in manipulating the cover 28.

The undersurface of the container 20 carries a built-in electric heating element 40 of a known, conventional type. This heating element 40 is disposed around the adjacent to the receptacle 22. The bottom of this receptacle 22 is located against a small fixed thermostat 42 which is held in place by means of screws 44 and a bracket 46. The bottom of the container 20 includes a small flat surface 48 against which there is located a known, conventional type of adjustable thermostat 50 incorporating within its interior an on-off switch. It will be realized that the thermostat 50 is a switch means capable of opening and closing in accordance with the manner in which it is set. This thermostat is adapted to be held in place by means of brackets 52 and screws 54. It carries a control shaft 56 which extends from it out through an opening 58 in the wall 14.

A conventional control knob 60 having a translucent calibrated or marked skirt 61 is carried on the end of the shaft 56 on the exterior of the wall 14. The markings on this skirt 61 indicate the degree of cooking eggs and are adapted to be moved with respect to other markings indicating a number of eggs to be cooked on a small, flat surface 62 on the wall 14 generally beneath the knob 60. The wall 14 carries within this surface 62 a small holder 64 for a light bulb 66. The illumination from this bulb 66 is adapted to be conveyed through openings 68 to beneath the skirt 61 so as to illuminate this skirt. The wall 14 also carries a conventional electric socket 69 used in connecting a power cord to the cooker 10.

As indicated in FIG. 4 of the drawing when power is supplied to the cooker it will flow through wires 70 through the adjustable thermostat 50 and thence through the fixed thermostat 42 and thence through the heating element 40 so that these various parts are connected in series with one another. The light bulb 66 is connected in parallel with the fixed thermostat 42 so as to be capable of being used as an indicator in a conventional manner to show the flow of current in the cooker 10.

The significance of the structure of the cooker 10 will be apparent from a consideration of its operation. When the cooker 10 is to be used normally water 71 will be placed in the receptacle. It will be realized that this is a fixed quantity of water since the capacity of the receptacle 22 is fixed. Then, a holder 72 having a perforate top 74 and a peripheral support flange 76 will be located within the container with the flange 76 resting on the wall 24 adjacent to the wall 26 through the use of a small handle 78 attached to the top 74. A desired number of eggs 80 to be cooked may be then located as shown in FIG. 2 of the drawing so as to be held in holes 81 in this holder 72.

Next the knob 60 is turned so as to place to a desired setting of cooked egg consistency or of solidity on the skirt 61 opposite the number of eggs to be cooked as indicated on the surface 62. Overrotation of the knob 60 during this operation is prevented by a small pin 82 on the shaft 56 abutting against a stop 84 on the thermostat 50. This movement of the knob 60 will have the effect of closing the circuit illustrated in FIG. 4, permitting current to flow through the fixed thermostat 42 and the heating element 40.

As this occurs heat will be transferred to the receptacle 22 vaporizing the water 71 within this receptacle. As such heat is transferred to the receptacle 22, it will of course be also transferred to the adjustable thermostat 50 causing this thermostat to periodically open and close. The rate at which this thermostat will open and close will of course be dependent upon its setting. In essence as the thermostat 50 is used it acts essentially as an infinite switch which delivers or allows a maximum amount of current to pass then it is set to open and close at the maximum temperature at which it is operative.

The higher the thermostat 50 is set, therefore, the greater the rate at which water is boiled out of the receptacle 22 as steam. Since the steam created is always at atmospheric pressure it will have a uniform heat content. As the steam is generated in this manner, it will fill the area between the container 20 and the cover 28 and gradually drift out of this area through the vent openings 36 and to some lesser extent past the edge 34. In so doing, this steam will surround the eggs 80 transferring heat to them. The heat transferred will, of course, accomplish the desired cooking.

By the setting of the thermostat 50, it is possible to regulate the rate at which water in the receptacle 22 is boiled out of it. When the receptacle is dry, its temperature will raise so as to actuate the fixed thermostat 42, cutting off the power to the heating element 40. The interval between the initial actuation of the thermostat 50 and the time when this occurs is, of course, the actual cooking time. In order for the fixed thermostat 42 to operate in this manner it is mounted on the container 20 adjacent to the receptacle 22 where it will primarily detect the temperature of this receptacle 22, and will only be influenced by or detect the temperature of the heating element 40 to a limited or restricted degree. It will be realized that the temperature of the receptacle 22 will tend to be maintained much lower than the temperature of the heating element 40 because of the cooling effect of water being boiled off from within this receptacle 22 as the heating element 40 is operated.

With the structure shown the heating element 40 is located on the container 20 between the fixed thermostat 42 and the adjustable thermostat 50 in such a manner that the adjustable thermostat 50 primarily detects the temperature of the heating element 42. This is to be contrasted with the mounting of the fixed thermostat 42 so that this thermostat 42 primarily detects the temperature of the receptacle 22. During the operation of the cooker 10, this receptacle will be maintained at about the boiling point of water, whereas the remainder of the container 20 remote from the receptacle 22 will be heated significantly more. This relationship will occur even though there is some heat conducted through the container 20 and even though there is a minor amount of radiation of heat from the various parts indicated and even though there may be some convection currents within the base 12.

The relationships described in the preceding in connection with the operation of the cooker 10 indicate temperature ranges of response for the thermostats 42 and 50 which can be considered as unexpected. Preferably the thermostat 42 used will open so as to break a circuit only at a temperature slightly in excess of the maximum temperature to which the receptacle 22 will achieve during the operation of the heating element 42 when water is within this receptacle. Normally this fixed thermostat will operate satisfactorily at temperatures around 20° to 30° F. above the boiling point of water.

As opposed to this, however, the adjustable thermostat 50 is normally exposed to considerably higher temperatures in excess of those at the thermostat 42 during the operation of the cooker 10. This is because there is no cooling effect from the vaporization of water between the heating element 42 and the adjustable thermostat 50. As indicated in the preceding, this adjustable thermostat 50 is located so as to be primarily influenced by the temperature of the heating element 42. This temperature is normally considerably greater than the temperature required to boil water during the operation of the cooker 10.

Because of the uniform heat content of the steam created as described, the amount to which the eggs 80 are cooked will be dependent therefore upon the setting of the knob 60 and the attached adjustable thermostat 50. This mode of operation is to be contrasted with prior devices in which a variable quantity of water is used to regulate the duration of the cooking cycle. This invention is predicated upon the transfer of substantially a uniform amount of heat to the eggs being cooked for a time period which is dependent upon the rate at which a substantially constant quantity of water is boiled.

Normally it is not considered that any significant variation should be made in the amount of water utilized in accomplishing a cooking cycle with the cooker 10. However, if desired, the container 20 can be filled with water up to about the junction of the walls 24 and 26 so as to make sure that the cooking cycle achieved is more than adequate to provide hard-boiled eggs. This involves the use of what may be considered an excess of water so as to obtain a cooking cycle which is longer than is considered necessary in most cases to cook eggs to a hard-boiled state. This invention in its normal utilization utilizes a substantially uniform or constant quantity of water which is boiled at different rates to obtain different degrees of cooking.

Occasionally in cooking eggs it is desired to cook them out of the shell in such a manner that they can be termed "-poached." Eggs may be cooked in this way by substituting a holder 86 as shown in FIG. 5 of the drawing for the holder 72. This holder 86 has a substantially disclike top 88 in which there is formed a plurality of depressions 90, each of which is adapted to hold a single shelled raw egg. A handle 92 is provided on the top 88 for the obvious purpose. In use this holder 88 is merely set in position on the wall 24 and the cooker 10 is operated as previously described.

Although the invention is primarily directed towards the cooking of eggs, the basic features can be utilized for other purposes. A fundamental aspect of the invention involves the use of a constant quantity of water as a timing device in conjunction with an electric resistance heater and an adjustable thermostat serving as a type of an adjustable switch which periodically opens and closes in accordance with its adjustment or setting so as to govern the operation of the resistance heater. With the structure involving these elements explained in this specification, the water is boiled and escapes as steam at rates which are dependent upon the setting of the thermostat. The steam generated through the boiling of the water is used with the present invention as a heat transfer means which transfers heat at a substantially uniform rate as a device of the invention is operated.

I claim:
1. A cooking device which comprises:
   a container including a receptacle for holding a fixed quantity of water said container being adapted to have a food support mounted therein;
   an electric heating element located with respect to said container so that when said heating element is operating heat from said heating element is transferred to the water in said container;
   an adjustable switch means capable of periodically opening and closing in accordance with its adjustment for governing the operation of said heating element connected in a series circuit with said heating element;
   a fixed thermostat connected in said circuit in series with said adjustable switch means and said heating element, said fixed thermostat being located so as to be operated by the temperature of said container;

said fixed thermostat being capable of opening said circuit upon an increase in the temperature of said container caused by all of the water in said container being boiled from said container through the operation of said heating element;

said adjustable switch means opening and closing said circuit in response to the temperature of said electric heating element so as to act as an infinite switch to allow a current to pass to said heating element in order to boil water from said container at a rate which is dependent upon the setting of said adjustable switch means, the operation of said adjustable switch means serving to regulate the time required to vaporize said fixed quantity of water.

2. A cooking device as claimed in claim 1 wherein:

said adjustable switch means is an adjustable thermostat and is located so as to receive heat from said heating element during the operation of said heating element;

said fixed thermostat is mounted on said container adjacent to said receptacle.

3. A cooking device as claimed in claim 1 wherein said electric heating element surrounds said receptacle and said adjustable thermostat is mounted on said container on the side of said heating element remote from said receptacle.

4. A cooking device as claimed in claim 1 including cover means for controlling steam given off from said container located on said container, said cover means being constructed so as to allow the escape of steam from the area between said container and said cover means.

5. A cooking device having a cooking container, said container being adapted to hold a quantity of water, an electric heating element located with respect to said container so that when current is applied to said heating element heat from said element is transferred to water in said container, and fixed thermostat means connected in series with said heating element, said fixed thermostat means being capable of being actuated so as to open upon a rise in the temperature of said container caused by the vaporization of all water from the interior of said container, in which the improvement comprises a switch means for controlling the flow of electric current to said heating element when said thermostat means is closed so as to pass a current to said heating element, said switch means being connected in series with said thermostat means and said heating element, said switch means being capable of opening and closing periodically during the operation of said cooking device so as to regulate the heat given off by said heating element in order to vary the time required for a given quantity of water to be vaporized from said container.

6. A cooking device as claimed in claim 5 wherein said switch means is an adjustable thermostat and is located with respect to said heating element so as to receive heat from said heating element during the operation of said heating element so as to open and close periodically when current can be passed by said thermostat means, the rate at which said adjustable thermostat opens and closes being determined by the setting of said adjustable thermostat.

7. A cooking device as claimed in claim 5 including cover means for controlling the steam given off from said container, said cover means being located on said container and being constructed so as to allow the escape of steam from the area between said container and said cover means.

8. A cooking device as claimed in claim 5 wherein said container includes a receptacle for holding a fixed quantity of water, said switch means serving to vary the time required to vaporize said fixed quantity of water when a current is passed by said fixed thermostat means.

9. A cooking device as claimed in claim 5 wherein:

said switch means is an adjustable thermostat and is located with respect to said heating element so as to receive heat from said heating element during the operation of said heating element so as to open and close periodically when current can be passed by said thermostat means, the rate at which said adjustable thermostat opens and closes being determined by the setting of said adjustable thermostat;

said container includes a receptacle for holding a fixed quantity of water, said switch means serving to vary the time required to vaporize said fixed quantity of water when a current is passed by said fixed thermostat means.

10. A cooking device as claimed in claim 9 wherein said electric heating element is located around said receptacle, said fixed thermostat means is secured to said receptacle within said electric heating element and said adjustable thermostat is mounted on said container on the side of said heating element remote from said receptacle.

11. A cooking device as claimed in claim 10 including cover means for controlling the steam given off from said container, said cover means being located on said container and being constructed so as to allow the escape of steam from the area between said container and said cover means.